Feb. 27, 1951  E. M. DELORAINE ET AL  2,543,002
AIRCRAFT INDICATOR SYSTEM
Filed April 26, 1944  9 Sheets-Sheet 1
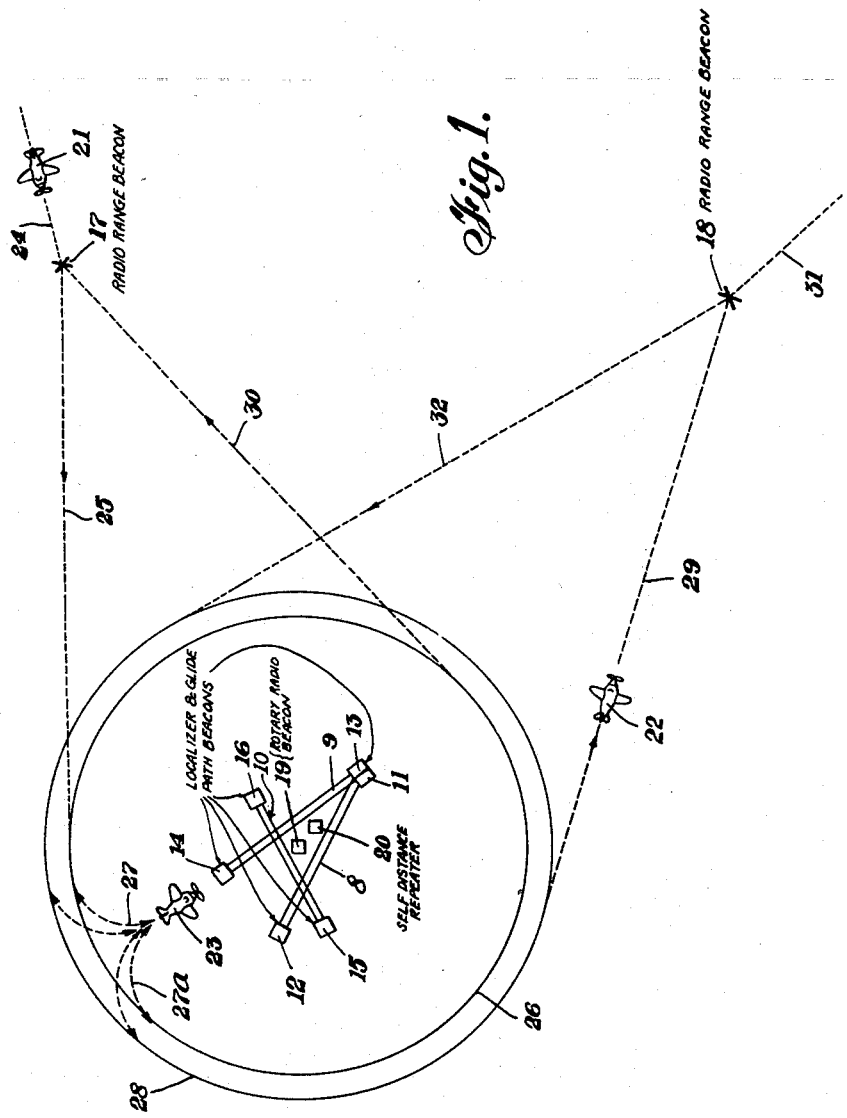
INVENTORS
EDMOND M. DELORAINE
HENRI G. BUSIGNIES
PAUL R. ADAMS
BY
R P Morris
ATTORNEY

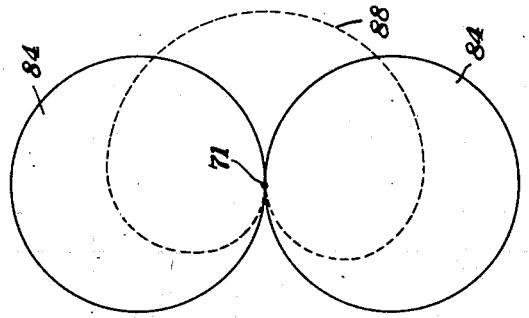
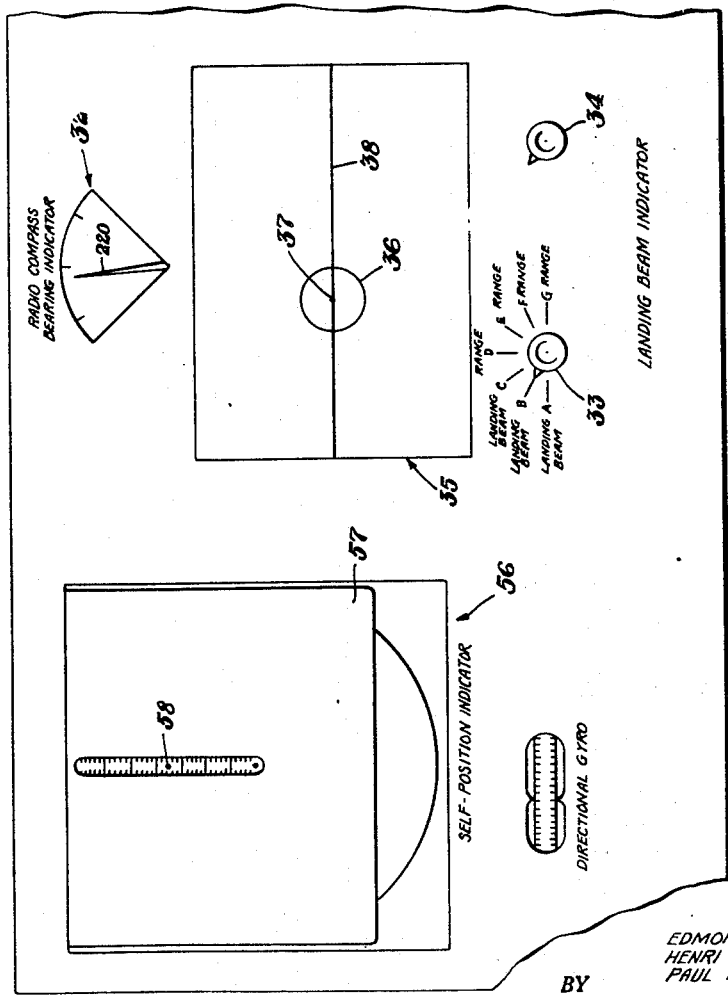

Feb. 27, 1951 E. M. DELORAINE ET AL 2,543,002
AIRCRAFT INDICATOR SYSTEM
Filed April 26, 1944 9 Sheets-Sheet 3

INVENTORS
EDMOND M. DELORAINE
HENRI G. BUSIGNIES
PAUL R. ADAMS
BY
R P Morris
ATTORNEY Feb. 27, 1951

E. M. DELORAINE ET AL 2,543,002

AIRCRAFT INDICATOR SYSTEM

Filed April 26, 1944

INVENTORS
EDMOND M. DELORAINE
HENRI G. BUSIGNIES
PAUL R. ADAMS

BY

*R. P. Morris*
ATTORNEY

INVENTORS
EDMOND M. DELORAINE
HENRI G. BUSIGNIES
PAUL R. ADAMS
BY
R P Morris
ATTORNEY

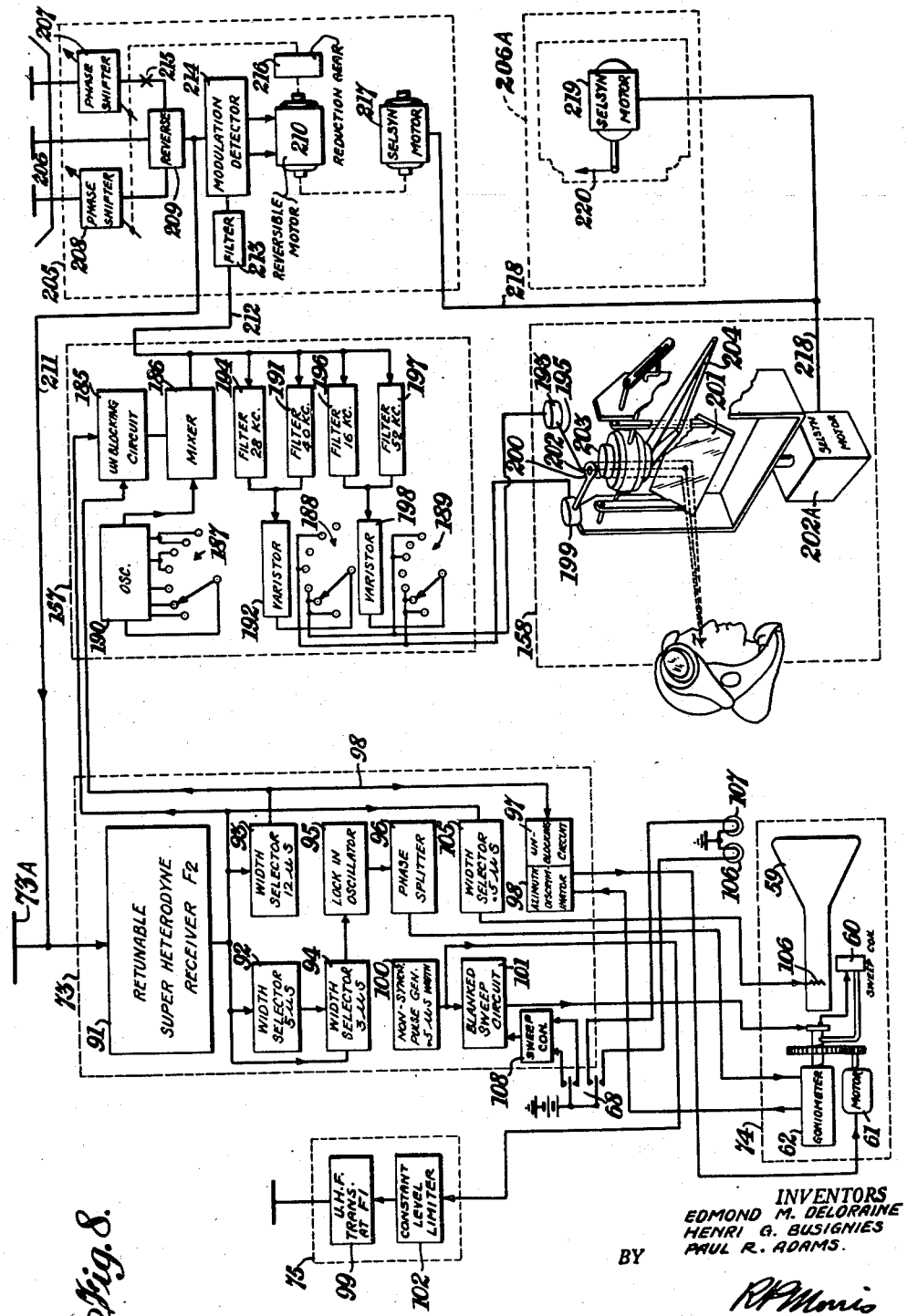

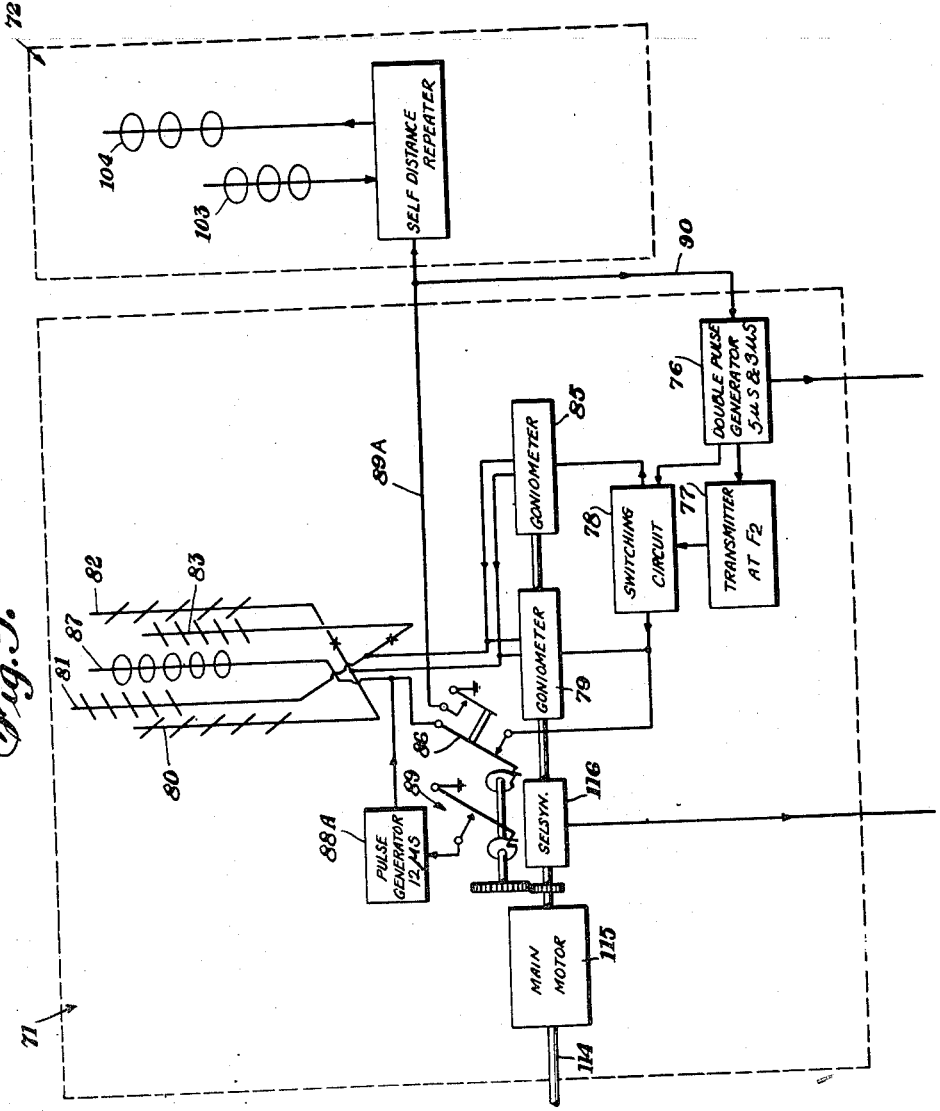

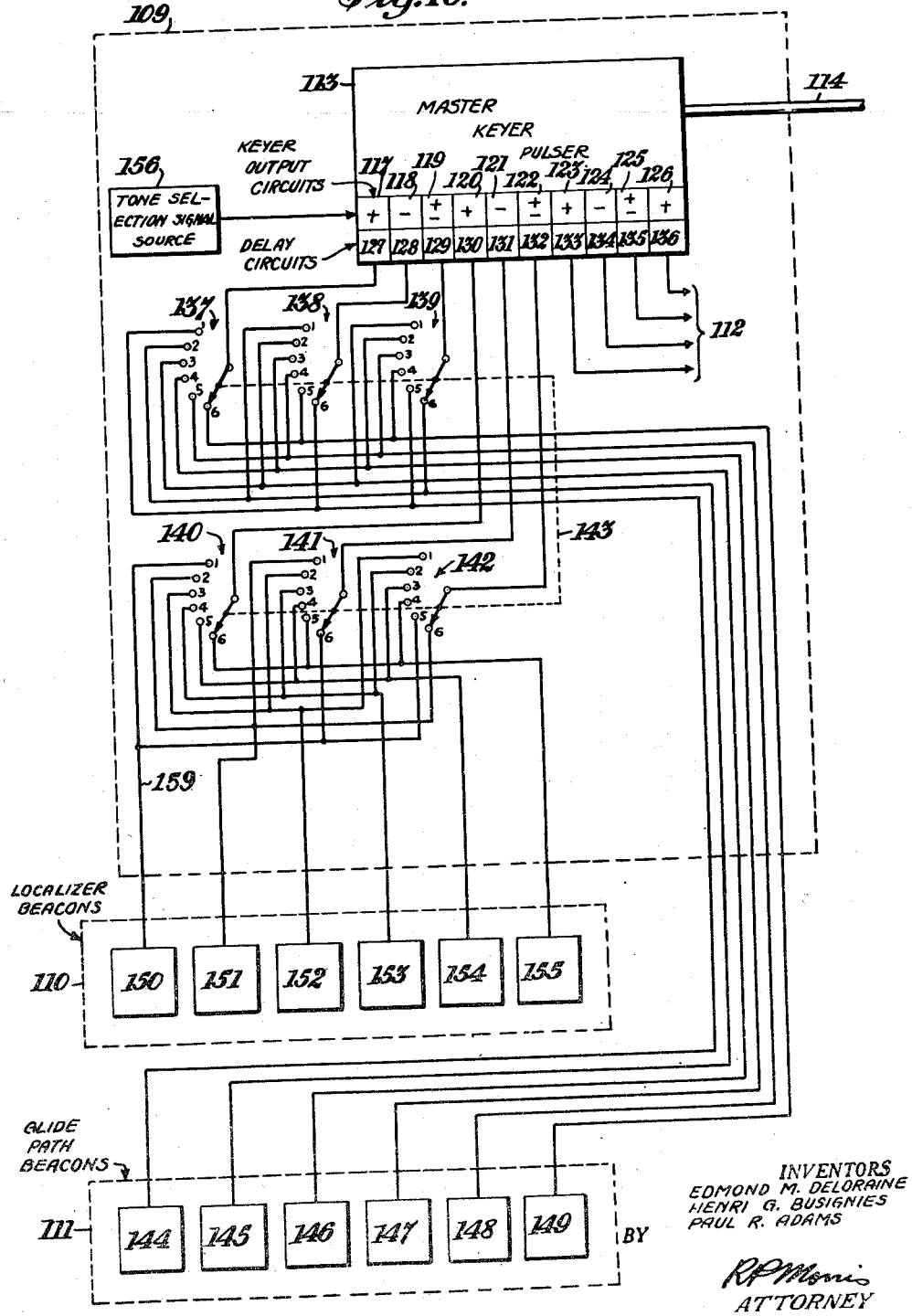

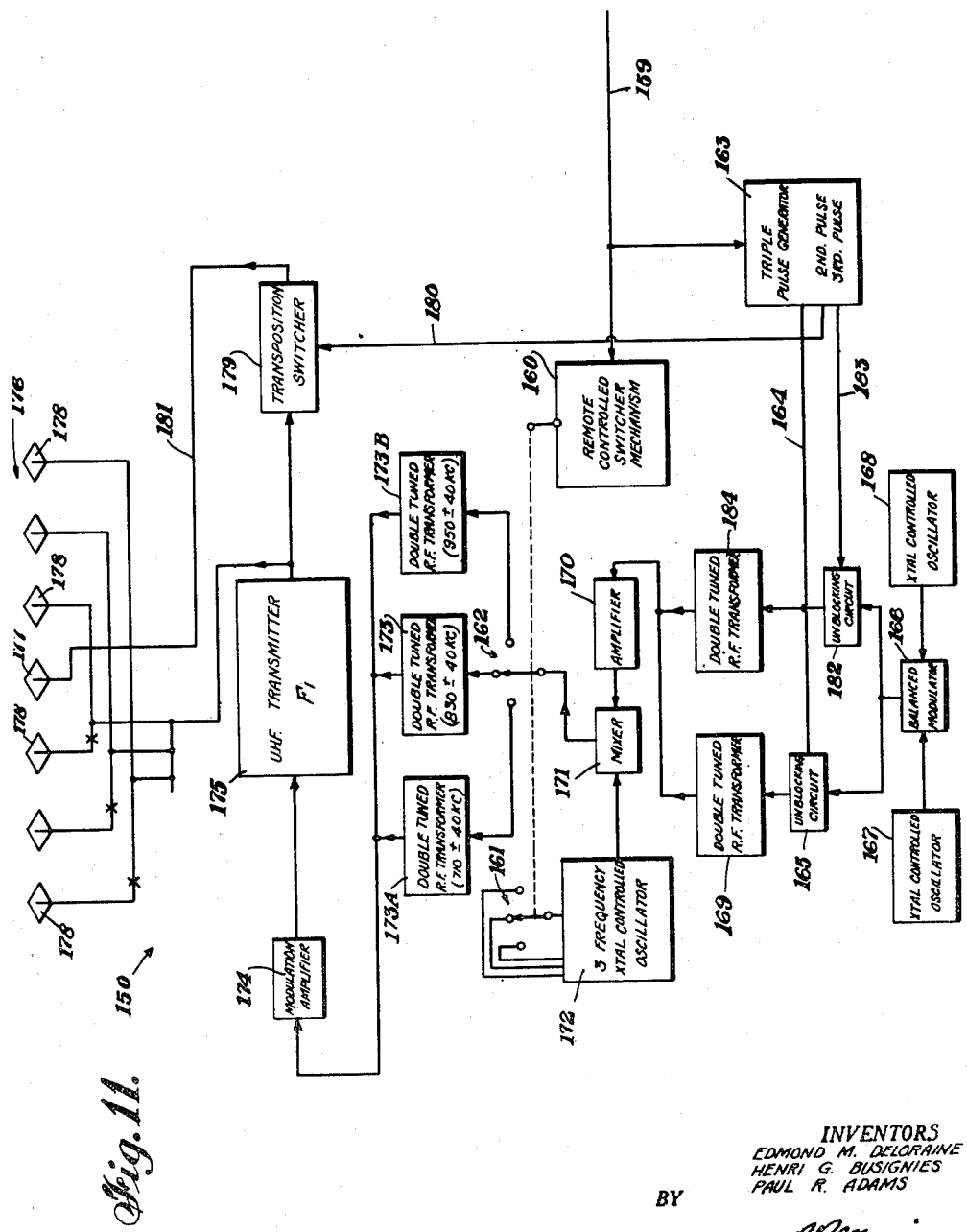

Patented Feb. 27, 1951

2,543,002

UNITED STATES PATENT OFFICE 2,543,002

AIRCRAFT INDICATOR SYSTEM

Edmond M. Deloraine, New York, and Henri G. Busignies, Forest Hills, N. Y., and Paul R. Adams, Cranford, N. J., assignors to Federal Telephone and Radio Corporation, New York, N. Y., a corporation of Delaware Application April 26, 1944, Serial No. 532,798

32 Claims. (Cl. 343—112)

This invention relates to aircraft and indicating-guiding systems and more particularly to systems for indication on an aircraft of its position relative to a guiding course or airport.

In aircraft guiding beacon systems it is important, particularly as air traffic increases, to provide systems which will permit on the aircraft position indications of the location of the craft and its position with respect to a given course line, particularly as it approaches an airport. In particular, it is desirable to have indicated on the aircraft its distance from an airport, its azimuth direction with respect to the airport, its location on course while approaching the air course, its location with respect to localizer and glide path beacons while landing and the attitude of the craft as to banking and turning from course and its up and down heading.

Instruments and beacon systems for providing all these indications have been developed. However, in these systems radio signals for performing the wave indications on the craft generally operate continuously and at different radio frequencies. Accordingly, these systems require a multiplicity of receiving arrangements on the aircraft and, in general, a large number of instruments on the panel in front of the pilot which must be kept under supervision while he is bringing the craft into an airport. The distance indications also are generally provided merely by a number of marker beacons arranged along the approach to the airport so that no continuous indication of the distance of the craft from the airport is provided.

It is an object of this invention to provide a simple system requiring a minimum of equipment on a craft to perform all or a selected number of the indicating functions outlined above.

It is a further object of our invention to provide a system of aircraft indication giving the position of the craft relative to an airport in direction and distance, the relative compass bearing of the craft, the attitude of the craft, and indications of localizer path and glide path and departure to the left or right from the localizer path.

It is a still further object of our invention to provide a novel system of aircraft and ground equipment to provide all the distance and position indications transmitted on a common carrier frequency.

It is a still further object of our invention to provide a system for transmitting successively the various services desirable for guiding an aircraft into a landing and for separating on an aircraft these service indications by means of particularly characterized pulses.

It is a still further object of our invention to provide a simple, novel receiver system for receiving all of the functional and guiding signals on a craft and producing desired indications therefrom.

It is a still further object of our invention to provide a simple self-position indicator system for use on an aircraft including distance repeater signals and rotary beacon signals.

It is a still further object of our invention to provide a combined course and attitude indicator on a craft giving on a single instrument up-down and left-right course indications of the heading of the craft, left or right from the course, indications of the craft of heading up and down from the desired course and indications of the bank position of the craft.

It is a still further object of our invention to provide a position indicator for showing on the craft the position of the craft with respect to the airport and during landing.

It is a still further object of our invention to provide a novel rotary beacon and azimuth indicating transmitter together with a receiver equipment for providing desired indications on the craft.

It is a still further object of our invention to provide a simple and novel structural arrangement of a combined landing and indication system.

In accordance with a feature of our invention, the various control and indication functions transmitted from an airport and beacon system to a craft are successively transmitted by relatively short impulses of energy. These impulses are transmitted at a sufficiently high repetition rate to provide substantially continuous indications on a craft. On the aircraft is provided a single receiver for receiving all of these functional signals and separating them for application to the separate functioning circuits. In order that all of these functional signals may be transmitted on a common frequency and selectively separated on the aircraft, the pulses of energy identifying the separate functions are given particular characteristics, for example different times of duration or width so that they may be readily separated on the craft. To perform the distance indicating function, we provide on the aircraft a transmitter for transmitting the distance indicating pulses. These pulses are received at the airport and a repeater station and repeated to the aircraft on the same carrier frequency as are the other signals, such as the localizer glide path and azimuth signal indications.

In addition to the regular beacons, we may provide at the airport a rotary beacon which may transmit an omni-directional signal when the beacon is pointed in a particular reference direction. By means of this rotary beacon signal and the reference pulses as transmitted, the azimuth direction of the craft with respect to the airport can be obtained.

In addition, there may be provided on the aircraft a direction finding antenna separate from the normal receiving antenna which may be used to obtain the direction of the craft relative to a particular localizer beacon so that an indication of the heading of the craft with respect to the localizer beacon may be obtained.

By combining on the aircraft the distance and azimuth indications in suitable polar co-ordinance, we may provide on the aircraft an indication showing directly the position of the airplane with relation to a map of the airport and surrounding territory. Such an arrangement will provide an accurate control of the flight patterns between radio range beacons and the localizer paths. This same instrument may be used to enable the airplane continuously to determine its distance from the end of the runway while following the localizer into a landing, thus avoiding the necessity of marker beacons as now used.

Further objects and features of our invention and the novel structural arrangements will become apparent from the particular description of an embodiment thereof made with reference to the accompanying drawings, in which:

Fig. 1 is a plan view illustrating the general airport and radio range system;

Fig. 2 is an illustration of the instrument panel showing the location of indicating instrument tuning;

Fig. 8 is a circuit diagram of the aircraft equipment for producing the various indications;

Figure 12:
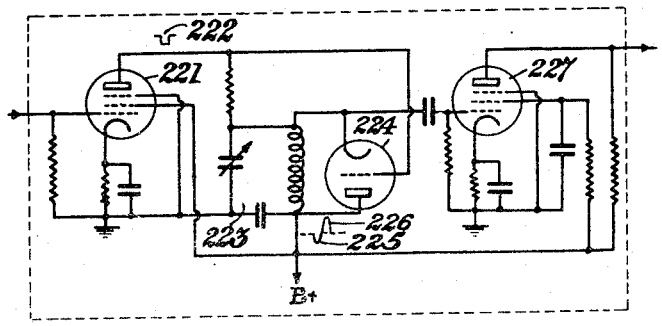

Figs. 9 and 10, taken together, illustrate the transmitter installation at an airport, Fig. 9 showing the rotary beacon and distance repeater circuits, and Fig. 10 showing localizer and glide path beacon arrangement;

Fig. 11 is a schematic circuit of a localizer;

Fig. 11A is a diagram of the field patterns produced in the rotary beacon of Fig. 9; and Fig. 12 is a wiring diagram of a pulse width selector circuit used in the system.

Turning first to Fig. 1, we have illustrated in plan view, a simple airport layout representative of our invention. In the airport are provided three landing runways 8, 9 and 10. At opposite ends of each of the runways 8, 9 and 10 are provided localizer and glide path beacons 11, 12, 13, 14, 15 and 16 which serve to provide landing signal indications for guiding a craft into landing. A plurality of radio range beacons spaced from the airport are shown at 17 and 18, which beacons serve to guide the aircraft to a location at a predetermined distance from the airport itself. Additionally, at the air port is provided a rotary radio beacon 19 and a self-distance repeater 20. The aircraft, such as shown at 21, 22 and 23, are each provided with receiving equipment for receiving signals from selected ones of the range localizer and glide path beacons for guiding the craft into the airport. Additionally, each of the aircraft is provided with transmitter equipment for transmitting pulses to the self-distance repeater 20 so that the aircraft may be apprised of its location with respect to the airport. The particular airport and aircraft equipment will be described in more detail in connection with other specific figures.

Aircraft 21, for example, is shown approaching the airport on range 24 provided by beacon 17. After passing beacon 17, the aircraft will follow a path 25 to a point tangent to the imaginary circle indicated at 26. The craft will circle the airport maintaining its distance on circle 26 by means of the self-distance repeater signals until instructions for landing are received. The craft will then follow path 27 provided by range beacon 13 into a landing at runway 9. As shown, craft 23 is now approaching a landing on this runway. It will be understood that generally only one of these three runways may be used at a time since only that runway in which the wind direction is favorable may be used. On departure from this runway a craft will follow the path 27A to the imaginary circle 26 or to an outer imaginary circle 28 and thereafter will follow one of the departure paths 29 or 30 to radio range 31, provided by range beacon 18 or to radio range 24, provided by beacon 17. Aircraft 22 is shown following a path 29 to the range 31. An approach path 32 from radio range 18 to outer circle 28 is also shown in the drawing.

It will be understood that, in addition to the radio signals from the radio equipment, the craft will be informed of its attitude with respect to the horizontal by means of a known type of equipment providing artificial horizon indicators and of its compass direction by auxiliary compass equipment arranged on the craft.

In accordance with certain embodiments of our invention, the functions of these auxiliary equipments are combined with the indications from the radio transmission apparatus on the craft to provide a combined signal indication.

Preferably, the radio beacon transmitters for providing the localizer, glide path, range and rotary beacon signals and, if desired, also the self-distance indication signals are successively operated and operate on a common frequency so that a single receiver and indicating apparatus may be provided on the craft to receive all of these indications. Furthermore, these signals are preferably repeated at relatively short intervals so that substantially continuous indications may be provided on the aircraft. This will be brought out more clearly in the further specific description of the particular circuit embodiments in accordance with our invention.

The various guiding functions are preferably combined on simple indicators so that all of these indications may be provided on simple panel instruments illustrated by way of example in Fig. 2.

In Fig. 2 the radio compass bearing indicator 32 is shown at the upper right. This indicator constantly points toward a selected one of the localizer or range transmitters (the selection of the transmitter for such radio compass bearings being preferably made by the same two knobs 33, 34 which select such transmitter for controlling the landing beam indicator as explained later). Thus, during a landing this radio compass bearing indicator always points at the same localizer being used for the landing. To simplify the required antenna installation, the radio compass is arranged to give bearings only over a 90° angle (i. e. 45° each side of the direction of flight). The indicator dial is correspondingly restricted to a 90° arc.

The landing beam indicator 35 is intended for displaying the "fly left" and "fly right" indications received from a localizer transmitter and the "fly up" or "fly down" indications received from a glide path transmitter as well as the bearing indications of the radio compass and certain gyro indications. This instrument essentially includes a modified type of crosspointer meter for producing a pattern for ring 36 and dot 37 representing the plane location indications of both the localizer and glide path plus a simple optical arrangement for bodily shifting the whole pattern in a vertical or horizontal direction under the control of the radio compass bearing and gyro tilt described in detail later. In addition a horizon bar 38 is provided which tilts to show the banking of the plane. Thus, the two types of location indications usually given by a crosspointer meter (planes located too high or too low or planes located too far left or too far right) are combined with the corresponding two types of attitude indications from a radio compass and a gyroscope (e. g. plane turned too far left or too far right and plane tipped too far up or too far down) and in addition the combined indicator also shows the gyro band indications (left wing low or right wing low).

In view of the fact that these three kinds of attitude indications must be viewed simultaneously with the corresponding two kinds of location indications in order to properly fly a landing beam, the combination landing beam indicator which shows all five types of indications at once is far more convenient to use than the separate types of indications now provided by the bearing indications of the radio compass, the bank and climb indications of the gyro horizon and the "fly up," "fly down," "fly right" and "fly left" indications of the crosspointer.

Figure 3:
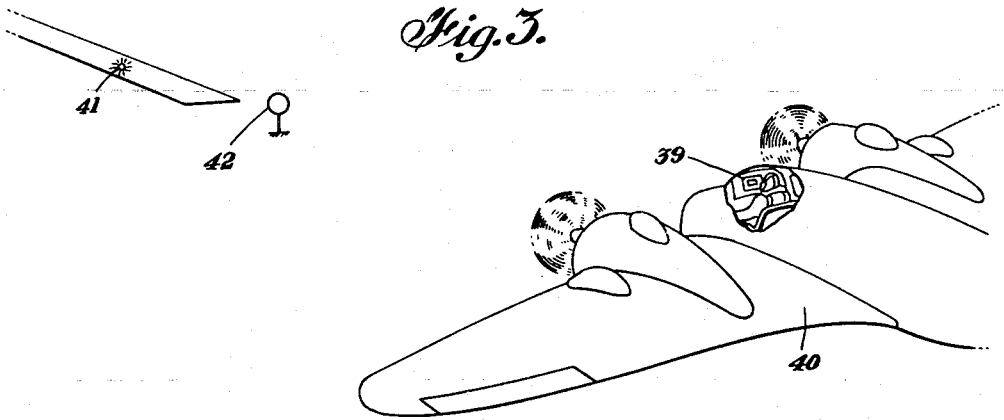
Fig. 3 is an illustration of an aircraft approaching a runway used in describing operation of one of the indicating instruments.

In accordance with our invention the five indications have been combined in such a way that the pilot can imagine that he is actually looking through a window 39 in the nose of the airplane 40 at a pair of illuminated figures fixed on the ground at the near end of the runway as shown in Fig. 3. One of the figures 41 should be imagined to be a moderate sized spot of light, e. g., a single lamp placed on the center line of the runway at the desired point of contact, while the other figure 42 should be imagined to be a 12 foot diameter ring of lights mounted on a pole about 30 feet high and 1000 feet closer to the airplane. The pilot should imagine that he is looking through the small window 39 about 18 inches in front of his eyes at the ring and spot.

When the plane is correctly located at the proper height as represented by the glide path and the proper horizontal position as represented by the localizer and in addition is correctly aimed directly at the spot of light on the runway, the ring and spot would be exactly aligned with each other with the spot appearing exactly in the center of the ring; and the complete pattern of spot and ring would be seen through the center of the window both vertically and horizontally in the imaginary case. Under these same conditions, the actual indications given by the landing beam indicator would also show the ring 36 and spot 37 aligned with each other with the spot centered in the ring and the whole pattern centered vertically and horizontally in the rectangular opening as shown in Diagram 43 of Fig. 4.

Assuming that the plane remains fixed in the same correct position in space, but alters its attitude by rotating so as to aim to the left or right of the spot of light, the relative position of the ring 36 and spot 37 would appear unchanged, but the whole pattern would occupy varying positions with respect to the window in the imaginary case.

Figure 4:
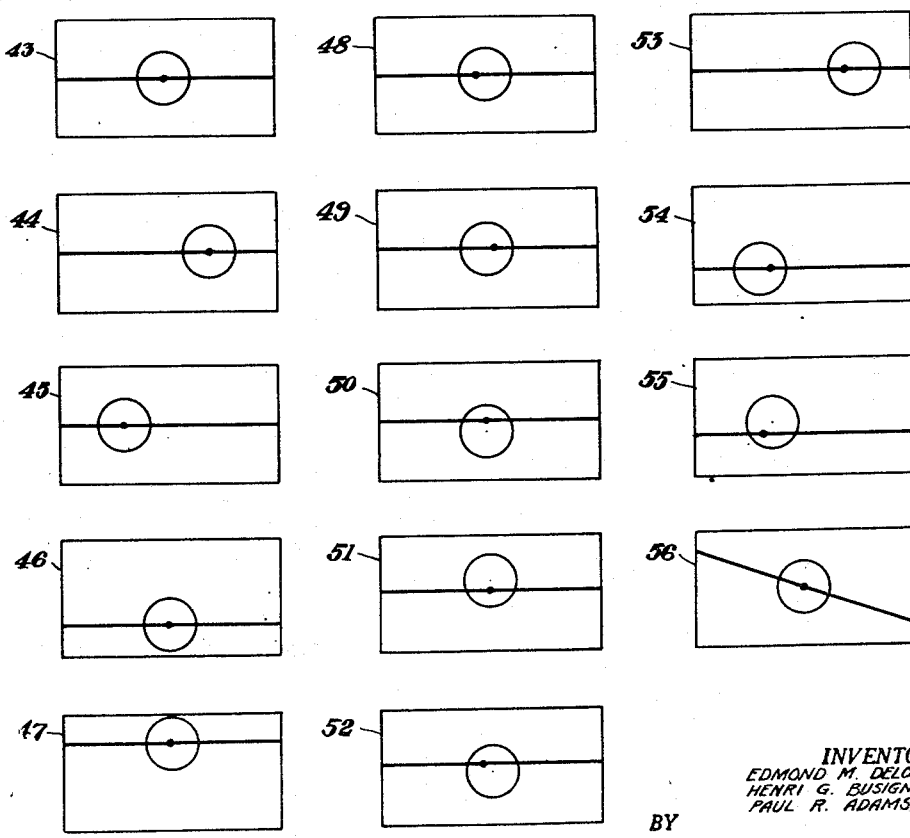
Fig. 4 is a group of diagrams indicating the appearance of the landing beam indication under different conditions.

Correspondingly, for these same changes in attitude of the plane, the indications given by the landing beam indicator of Fig. 2 would show the luminous spot 37 and ring 36 unchanged in relative positions, but shifted with respect to the rectangular frame as indicated by Diagrams 44, 45, 46, 47 of Fig. 4.

If instead of remaining in the correct location and changing its attitude, the airplane is assumed to be kept aimed directly at the spot of light on the runway but to be displaced in position so as to be too far to the left or too far to the right of the localizer equi-signal zone, or above or below the glide path equi-signal zone or to be displaced simultaneously in height and horizontally (e. g. above the glide path and to the left of the localizer equi-signal zones simultaneously) the whole pattern of ring and spot would remain approximately centered in the window but the ring 36 would change in position relative to the spot 37. The indications actually given by the landing beam indicator in such cases would again correspond to the imagined appearance of the lights (see Diagrams 48, 49, 50, 51, 52 of Fig. 4).

In cases where the plane is simultaneously incorrect in its location and in its aiming, the indicator will continue to give representations corresponding to the appearance of the single lamp and ring of lights seen through a window in the imaginary case. A few such indications are represented in Diagrams 53, 54, and 55 of Fig. 4.

For giving the required indications of the angle of bank of the airplane a horizon bar is provided which tilts to show this angle. This horizon bar 38 is maintained substantially in line with the center spot 37 which represents the distant single point of light on the runway, so that the horizon bar must be imagined to represent a white string of lights arranged on the ground perpendicular to the runway and passing through the point of contact where the single spot is supposed to be located. Diagram 56 shows how this bar tilts.

In addition to being used for flying the landing beam i. e., the combination of a glide path and localizer, the landing beam indicator may also be used for flying a range. In this case, the ring 36 and spot 37 will continuously remain in the same horizontal line and only the sideways deflections of the center spot as well as the sideways displacement of the complete pattern will be used for displaying the corresponding left or right displacements of the plane from its correct location as well as its left or right twistings from the correct heading.

Immediately below the landing beam indicator 35 of Fig. 2, two knobs 33 and 34 are provided. Knob 33 serves to select the desired landing beam or range, while knob 34 selects one of three carrier frequencies which may be used at different adjacent airports. The proposed system enables all indications required around one airport to be given on one single frequency. Three or more different frequencies will be provided, however, in order that closely adjacent airports may be operated on different carrier frequencies. Upon approaching a given landing field, the control tower will instruct the pilot which landing beam he is to take, and the pilot will know from his maps which carrier frequency is assigned to the field. Thus, if he is instructed to take landing beam C, on a field whose carrier frequency is II he will merely turn his knobs to C and II respectively.

The self-position indicator 56 shown at the left of Fig. 2 is illustrated with a shield 57 lowered as it would be used in flying along the chain of ranges. In this condition it merely shows at 58 the distance from the airplane to the next range station.

Figure 5:
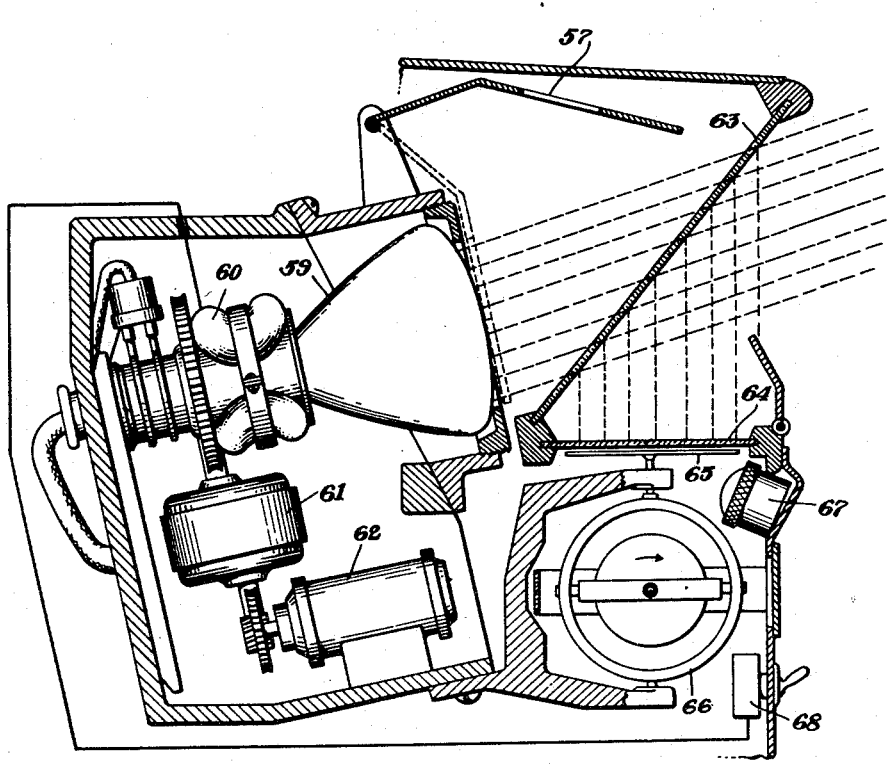
Fig. 5 is a sectional view illustrating a mechanical arrangement of a super-position unit.

For the purpose of flying around an airport, according to the system of the present proposal, the self-distance shield 57 should be raised as shown in the detailed illustration of the self-position indicator, Fig. 5.

In this figure is provided a cathode ray indicator 59 provided with rotary deflector coils 60. These coils are rotated about tube 59 by a motor 61 as will be described later in connection with the circuit diagram of the aircraft equi-signal. Motor 61 also drives a rotary pick-up coil on goniometer 62 which supplies deflection voltages to coils 60. In a manner to be described in more detail later this cathode ray indicator provides a spot on the screen of tube 59 indicative of the position of the craft from the airport in azimuth and direction.

Immediately in front of the screen of cathode ray indicator 59 is provided a viewing screen 63. Screen 63 is preferably in the form of a half-silvered mirror so that the indications from tube 59 may appear thereon simultaneously with reflected images. Below screen 63 is provided a cover glass 64 which serves to support map cards.

Figure 7:
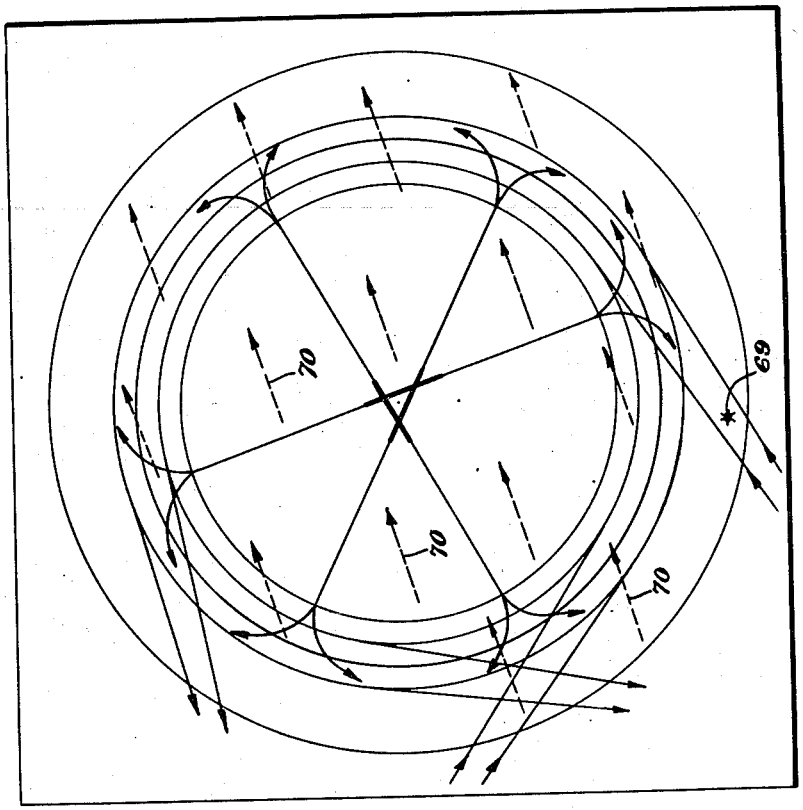
Figs. 6 and 7 are card-map indications to be used with the super-position indicator of Fig. 5.
Figure 6:
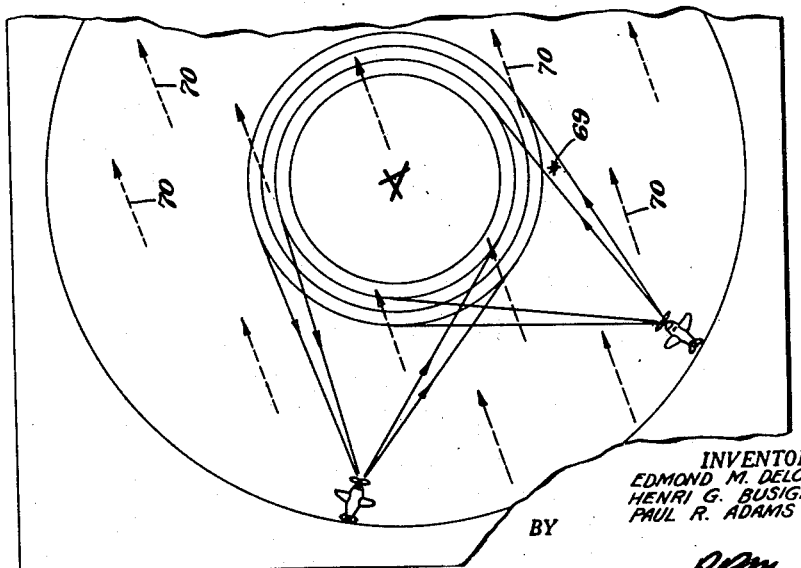

These maps show the radio range and the airport, as illustrated in Fig. 6, and the immediate vicinity of the airport, as shown in Fig. 7. Preferably the two maps are traced on a transparent or translucent card with different colored transparent ink, for example in purple and orange. The map of Fig. 7 is made to a larger scale than the general terrain map of Fig. 6 and may be used to guide a craft during the landing.

A transparent compass card is mounted on a gyro-compass 66 so that it will, at all times, be properly aligned with the true or magnetic north. On this card are provided markings showing the true north. It is clear that in place of a gyro-compass, other known means for maintaining a card 65 in a true or magnetic north position may be used. As a consequence of this supporting arrangement the indicating spot appearing on the screen of tube 59 will be superposed on the map reflection on screen 63 so that the pilot will be enabled directly to read his position with respect to the adjacent terrain.

A switch 68 is provided to turn on with one of two coloured lights provided in lamp 67 so that a selected one of the two maps may be read. Simultaneously with this switching action, switch 68 also serves to change the sweep voltage amplitudes applied to the rotary deflecting coils 60 so that the sweep of the beam of tube 59 will correspond to the larger or smaller scales of the maps shown in Figs. 6 and 7. Thus, as the craft approaches the airport, these different maps may be visually indicated and simultaneously the magnification of the image will be changed so that the pilot may readily determine his position by the combined image formed on screen 63.

Assuming the magnification switch 68 is set for small scale indications, the raising of the self-distance shield will turn on a sharply filtered purple light in lamp 67, thus illuminating the card 64 from below. All indications shown on the back of the card in purple transparent ink become imperceptible and only the indications shown in orange can be seen. The card then appears as shown in Fig. 6 of giving a small scale representation of the region around the airport. Under this condition, the visible area would represent a circle of given diameter, for example, 40 miles, thus showing not only the actual runways and the prescribed traffic circles to be flown, but also the straight "arrival" and "departure" branches which should be followed in flying between the ranges and the traffic circles.

In the carrier frequency selection switch below the landing beam indicator is set to the carrier frequency II, which is assumed to be the frequency used by the airport, a greenish-white spot from cathode ray indicator 59 will appear superposed on the illuminated card 64 on screen 63. This spot will represent the position of the airplane on the map as shown at 69. A group of black dotted arrows 70 will also be projected upon the underside of the card 64 from a light weight transparent disc 65 mounted on the gyro compass 66. The position of the arrows thus shown will represent the direction in which the airplane is headed with respect to the map shown on the card.

Thus, the indication given will show simultaneously the complete position of the airplane and its heading with respect to the map of the airport. Such an indication will enable the pilot to follow accurately any prescribed course which may be printed on the map. In the illustration shown in Fig. 6, it is assumed that the pilot is flying northeast toward the airport on the "arrival branch" of the DII range from a place which, for the sake of illustration, we shall call Hammerton.

Since the spot 69 is properly centered on this branch, the pilot will know that he is in the correct location. Since the dotted arrows 70 are pointing slightly too far to the right, however, the pilot will know that he must turn his plane a few degrees to the left if he is to continue on the prescribed branch.

When the plane arrives close to the traffic circles, the pilot will throw the magnification switch 68 to high magnification, thus changing the color of the illumination from light 67 to orange and at the same time changing the magnification of the sweep of the scope. All lines printed in orange will then disappear and only the purple printing on the back of the card will show so that the card will appear as in Fig. 7. The position of the airplane will correspondingly shift outward on the screen so that the airplane will still be seen at 69 in the same relative position and attitude on the magnified map (i. e., on the arrival branch of the Hammerton range close to the traffic circles, but aiming slightly to the right of the correct direction).

The same map indication may then be used for flying around the traffic circles and finally when permission is given, the plane will make a perfect curved turn toward the assigned runway, this turn being accurately controlled in accordance with the curved route printed on the map. As soon as the pilot arrives accurately in line with the runway, he will cease to fly by the map indications and will turn his attention to landing beam indicator which will then give him a high precision indication of both location and attitude vertically and horizontally as previously described.

The functions which must be performed to provide for self location are the determination on the plane of its own distance from the center of the airport and the determination on the plane of its azimuth angle as seen from the center of the airport. Both these functions require cooperation between equipment on the ground and equipment in the airplane. The following explanation of the principles of operation of the self-location service will be made in conjunction with Fig. 8 representing the airplane equipment and Figs. 9 and 10 representing the airport equipment.

Turning first to Fig. 9, basically, 71 is a rotary beacon for sending out signals enabling a plane to determine its azimuth, while 72 is a self-distance repeater designed to receive certain types of pulses at a given frequency $F_1$ 1000 mc. and to re-transmit them at a different frequency $F_2$ for the purpose of enabling the plane to determine its distance from the center of the airport. In the airplane, Fig. 8, the unit 73 is primarily a receiver for receiving the azimuth signals from 71 while 74 is essentially an electromechanical unit for converting the received azimuth signals into mechanical rotation of oscilloscope sweep coil 60.

The nature of these various equipments as well as their principles of operation can best be explained by tracing the progress of a set of azimuth signals through rotary beacon 71 and self-position reception unit 73 to indicator 74, and by then separately tracing the progress of a self-distance pulse from self-position reception unit 73 through transmitter 75 to the self-position repeater 72 as well as the progress of the re-transmitted self-distance reply pulse from the repeater 72 through the self-position reception unit 74 to the indicator 59.

The signals sent out from rotary beacon 19, Fig. 1, whose circuit details are as shown in Fig. 9, for determining azimuth are of two kinds; rotary signals and reference signals. The rotary signals consist of a series of pairs of pulses of two different characteristics, for example, of 5 microsecond and 3 microsecond pulse widths transmitted for example 4000 times a second with two different directive patterns so chosen as to sharply define an imaginary line hereafter called the sweep line. These diagrams are both rotated at a given speed, for example at 12 times a second whereby the sweep line is correspondingly rotated. The reference signals merely consist of pulses of, for example, 12 microseconds width which are sent out uniformly in all directions at the instant when the sweep line is passing through true north. The latter reference pulse is only sent out every alternate time that the sweep line passes through north, so that this reference pulse is transmitted only 6 times per second.

The pairs of pulses of 5 and 3 microseconds width are generated in double pulse generator 76 which is arranged to send out first a 5 microsecond pulse and then immediately thereafter a 3 microsecond pulse, such a pair of pulses being transmitted once every 250 microseconds. Both these pulses are applied to the same transmitter 75 77, operating at frequency $F_2$, but a switching circuit 78 which is timed by the pulse generator 76 routes the two types of pulses through different channels, so that these can be radiated with different directive patterns. The 5 microsecond pulses pass out through the right hand side of switching circuit 78 to goniometer 85 which applies the signals variably to the four antennas 80, 81, 82, 83 with such magnitudes and phases as to produce a figure of eight pattern 84 (see Fig. 11A) having one of its null directions aligned with the imaginary sweep line to be defined. The second null which is not desired but is inherent in this type of pattern will be aimed to the rear (i. e., 180° away from the imaginary sweep line). The three microsecond pulses pass out of the left side of switching circuit 78 whence they are transmitted through goniometer 79 to the four antennas 80, 81, 82, 83, and simultaneously through the normally closed cam switch 86 to the central antenna 87. The relative strengths of these signals is such as to produce a cardioid pattern (88 of Fig. 11A); and the position of goniometer 79 is shifted 90 degrees with respect to that of 85 so that the maximum of this cardioid will be aligned with the imaginary sweep line while the null of the cardioid is aimed backwards in line with the undesired second null of the figure of eight pattern. By such an arrangement of the patterns, the imaginary sweep line is quite sharply defined since this line will be the only direction in which a plane will receive pulses of 3 microsecond width without the reception of any pulses of 5 microsecond width.

The reference pulse of 12 microsecond width is generated by pulse generator 88A which is triggered for this purpose by a switch 89 geared down from the main motor 115 so as to close 6 times per second when the sweep line is passing through true north. This 12 microsecond pulse is applied only to the omni-directional antenna 87, the switch 86 serving to disconnect this antenna from the other antennas at this instant. The switch 86 also applies a ground to pulse generator 76, over lines 89A, 90 at this same instant, so as to temporarily stop the transmission of the 5 and 3 microsecond pulses, during the interval when the 12 microsecond pulse is to be transmitted and for about 12 milliseconds thereafter.

In the airplane equipment shown in Fig. 8, the various azimuth pulses are picked up by the antenna 73A of self-position unit 73 and received by the receiver 91 of this unit. The pulses delivered by the output of this receiver are separated by the width selectors 92, 93, 94.

The output of width selector 92 which passes only the 5 microsecond pulses is applied to bias the width selector 94 so as to block the latter for a given interval, say 25 microseconds. Therefore, the received pulses of 3 microsecond width are not able to pass through width selector 94 except when these are received without any 5 microsecond pulse immediately preceding them. Thus, pulses of 3 microseconds width will only be delivered from selector 94 in brief groups 12 times a second when the imaginary sweep line of the rotating beacon swings past the airplane under consideration. The pulses thus delivered from 94 synchronize a lock-in oscillator 95 of a given periodicity, for example 12 periods per second; and the output of this oscillator 95 is passed through a phase splitter 96 to the stator coils of goniometer 62, thus producing in this goniometer a magnetic field rotating 12 times per second.

The 12 microsecond reference pulses which are sent out in all directions every second time that the imaginary sweep line passes through true north are similarly picked up by the antenna 73A of reception unit 73, received in the receiver 91, and selected by width selector 93. From this width selector, the pulses pass to an unblocking circuit 97 over line 98 to momentarily unblock the associated discriminator circuit 98.

The rotatable (but normally stationary) search coil of goniometer 62 is continuously connected to the discriminator circuit 98 so that the alternating voltage produced in this search coil by the rotating field above mentioned, is continuously applied to this discriminator circuit. In the normal blocked condition such alternating voltage produces no effect but when the discriminator 98 is unblocked by the arrival of the 12 microsecond reference pulse, the polarity which the alternating voltage has at that instant will control the discriminator circuit so as to cause the latter to send out a positive or negative current for a short time (e. g. $\frac{1}{10}$ of a second). This brief surge of current passes through the motor 61 thus tending to drive this motor clockwise or counterclockwise, with a corresponding rotation of the search coil of goniometer 62.

Assume that the relation between the time of receipt of the reference pulse and the time of receipt of the 3 microsecond pulses (without 5 microsecond pulses) is such that the goniometer search coil has a positive voltage at the instant of unblocking of this discriminator 98. Then at each unblocking of this discriminator circuit a positive current will pass through motor 61 which will finally cause this motor to turn and rotate the goniometer search coil. This will continue until the goniometer search coil assumes a position such that the voltage which it delivers to the discriminator circuit 98 is zero at the instant of the unblocking of the discriminator circuit.

Thus, the action of the discriminator circuit 98 and motor 61 is such as to rotate the goniometer search coil to a given position dependent upon the time of receipt of the reference pulse with respect to the instant when the imaginary sweep line the rotary beacon swings past the airplanes. This will mean that the goniometer search coil will always assume a position corresponding to the azimuth angle of the airplane as seen from the rotary beacon 71.

In addition to the azimuth angle, it is also necessary to obtain an indication of the airplane's distance from the center of the airport, in order that the complete position of the airplane can be shown on a map of the airport. Such an indication is obtained by triggering transmitter 99 by pulses from pulse generator 100 to cause it to transmit at its carrier frequency of F1 a self-distance pulse of a given character, for example, of ½ microsecond width to the self-distance repeater 72 at the airport (Fig. 9). The self-distance repeater then re-transmits a corresponding self-distance reply pulse also of ½ microsecond width but on a different carrier of F2 frequency. The self-distance reply pulse is then received in 91; and the distance of the airplane from the ground is determined by using this reply pulse to illuminate a spot on the screen of self-position oscilloscope 59 whose deflection plates are fed from a sweep circuit 101 synchronized with the transmission of the outgoing self-distance pulse from generator 100.

Considering these operations in greater detail, the self-distance pulse originates in non-synchronous generator 100 which generates a pulse of ½ microsecond width approximately 30 times per second. The pulses from 100 are applied through limiter 102 in the transmitter unit 75 to the F1 transmitter 99 which thereupon radiates a corresponding half microsecond pulse of F1 carrier to the self-distance repeater 72 at the airport. This self-distance repeater receives the self-distance pulses on antenna 103 and retransmits a pulse of the same width but on a different carrier frequency F2 from antenna 104, this pulse being referred to as a self-distance reply pulse.

The reply pulse from repeater 72 is picked up by the antenna 73A of self-position reception unit 73, received in receiver 91 and selected by width selector 105. From the output of 105 the pulse is applied to a control grid 106 of oscilloscope 59 in the self-position oscilloscope unit 74. At the instant when the pulse was applied from the pulse generator 100 to the transmitter unit 75, this same pulse was also applied to blanked sweep circuit 101 to initiate the sweeping action of this circuit. The sawtooth sweep voltage thus produced is applied to sweep coil 60 which magnetically controls the beam deflection of oscilloscope 59. Accordingly, when the self-distance reply pulse is applied to the grid of this tube, as previously described, the visible spot thus produced has a radial deflection corresponding to the time interval between the sending of the self-distance pulse and the reception of the self-distance reply pulse. Thus, the radial deflection of this spot measured from the center of the oscilloscope accurately represents the distance of the airplane from the center of the airport.

The direction in which the spot is radially deflected outward from the center of the circle, depends upon the rotary position of the sweep coil 60. This coil, however, is supported by the shaft of the goniometer 62 so that its position corresponds to the position of the search coil of this goniometer. As was previously explained in connection with the description of the transmission and reception of azimuth signals, the search coil of this goniometer 62 is controlled so as to constantly assume a position corresponding to the azimuth angle of the airplane as seen from the beacon 71 at the center of the airport. Thus, the luminous spot appearing on the screen of the oscilloscope 59 will have a position which corresponds both in distance and azimuth to the position of the airplane with respect to the center of the airport.

In order to render the indication more useful, the self-position unit is preferably arranged as shown in Fig. 5, so that the screen of the cathode ray tube whose spot represents the position of the airplane has apparently superposed upon it an image of a translucent map of the airport. A switch 68 (Fig. 8) is provided to change the scale of the map by varying the color of its illumination by lamps 106 and 107, as previously described. This same switch is arranged to change the scale of the radial deflections of the oscilloscope beam by controlling sweep control circuit 108.

The functions to be performed in order to render the landing beam and range service are essentially the functions generally performed separately by a number of glide paths, localizers and ranges on the ground cooperating with separate glide path receivers, localizer receivers and range receivers in the air. In accordance with the present invention, all these services are rendered simultaneously on one single carrier frequency which is also the same frequency used for the self-location services.

These functions will now be described in connection with Figs. 8 and 10. The usual 90 and 150 cycle tone frequencies may be replaced by high frequency "tones" of the order of hundreds of kilocycles; and these different frequencies of "tones" are used for the different glide path and localizer equipments. As an example, a system having the runways A, B and C and four range beacons called D, E, F and G may be considered. Twenty such "tones" are, therefore, required, the lowest four tones being used for the "A" glide path and localizer combination, the next four for the "B" glide path and localizer combination and the third group of four for the "C" combination of glide path and localizer. The last eight tone frequencies are allotted in pairs to the ranges D, E, F and G.

A suitable set of twenty tones is as follows:

718 and 650 kc. for "A" glide path
838 and 770 kc. for "B" glide path
958 and 890 kc. for "C" glide path
742 and 674 kc. for "A" glide localizer
862 and 794 kc. for "B" localizer
982 and 914 kc. for "C" localizer
1078 and 1010 kc. for "D" range
1102 and 1034 kc. for "E" range
1198 and 1130 kc. for "F" range
1222 and 1154 kc. for "G" range It will be noted the above listed tone frequencies have been selected according to a systematic plan so that the lowest four frequencies, when mixed with a heterodyning oscillation of 702 kc. and then demodulated will yield beat frequencies of 16, 28, 40 and 52 kc. respectively. The next four tone frequencies, when mixed with a heterodyning oscillation of 822 kc. and then demodulated will also yield the same values of beat frequencies (16, 28, 40 and 52 kc.) while the third group of four tones when heterodyned with 942 kc., or the fourth group of four tones when heterodyned with 1062 kc., or the fifth group of four tones when heterodyned with 1182 kc. will also yield the same four beat frequencies. This relationship between the tone frequencies simplifies the design of the receiver which need only have four fixed filters for passing 15, 28, 40 and 52 kc., respectively, and five crystals for providing heterodyning frequencies of 702, 822, 942, 1062 and 1182 kc.

In order to still further reduce the possibility of interference between the various glide path, localizer and range transmitters, the several transmissions from these transmitters takes place intermittently at a rapid rate, for example, six times per second, and definite time intervals are assigned to each transmission so that no two transmissions will take place simultaneously. Also, each transmitter sends its own two transmissions successively. In other words, in the case of a glide path transmitter, the "fly up" and "fly down" signals are successively transmitted, similarly in the case of a localizer or range the "fly left" and "fly right" signals are successively transmitted. Accordingly, ten different pairs of time intervals are required for the simultaneous operation of three glide paths, three localizers and four ranges.

In order to carry out the above mentioned two principles of timing the transmissions of the different glide paths and localizers so as to occur successively and adjusting their modulation frequencies so as to be different from one another, the ground equipment required for the landing beam and range service includes not only the glide path, localizer and range transmitters themselves, but also a central "landing beam control equipment" which is shown in Fig. 10.

Fig. 10 shows essentially control equipment 109, together with a number of localizers 110 and a number of glide path beacons 111. A number of range beacons are also provided connected to leads 112 but are not shown and need not be considered in detail since they may be of any conventional form.

If more runways are provided a correspondingly greater number of beacons may be needed as will be clear.

The landing beam control equipment 109 comprises a master keyer 113 mechanically driven by shaft 114 the main motor 115 (Fig. 9) which serves to drive goniometers 79, and 85, Selsyn 116 and switches 86 and 89 in the rotary beacon system. This keyer may be of any conventional construction wholly mechanical or partially mechanical and partially electronic, and is arranged to produce six groups of synchronizing impulses per second, each such group being sent out during the 12 millisecond interval when the transmission of the 5 and 3 millisecond pulses normally sent out by the rotary beacon 71 is temporarily silenced by switch 86 of such beacon. Each of these groups of synchronizing impulses produced by the keyer 113 consists of 10 triggering impulses of any convenient length transmitted successively one millisecond apart over the 10 separate output circuits 117, 118, 119, 120, 121, 122, 123, 124, 125, 126. Each of these 10 output circuits is preferably provided with a corresponding delay adjustment by means of circuit 127—136 so that the relative timing of the synchronizing pulses received over these 10 outputs can be accurately adjusted.

The last four of the 10 output circuits are used for synchronizing the range transmissions which are located away from the airport and the corresponding outputs 123, 124, 125, 126 of 113 are therefore, connected to the airways terminal equipment over lines 112. The first six sets of synchronizing pulses in each group are used to synchronize the transmissions of three of the localizers and three of the glide paths.

In the simple three runway system only one glide path and one localizer beacon would normally be operative. At a larger airport more runways may be available for simultaneous use. It is considered, however, that not more than three glide paths and three localizers will be operated at any one time. The selection of which three localizers and glide paths are to be used at any given time will be principally governed by the direction or velocity of the wind which may change within a comparatively short interval. It is desirable to provide for changing selection of these beacons quickly and conveniently. Accordingly, a group of six switches 137—142 are provided, which are ganged to be operated by one single manual control 143 and the connections from the first six output circuits 127, 128, 129, 130, 131, 132 of master keyer 113 to the selected three glide path beacons and three localizer beacons are controlled by these switches. The six glide path beacons are designated by 144—149 respectively and the six localizers by 150—155 respectively.

If the ganged switches 137—142 were set to their first position with their wipers resting on their number 1 contacts, the first three output circuits 117, 118, 119 will be routed to glide paths 144, 145 and 146 respectively, while the next three outputs 120, 121 and 122 will be routed to localizers 150, 151 and 152. Thus, localizer 150 and glide path 144 will be made effective to define a first landing beam; localizer 151 and glide path 145, would be effective for a second landing beam; and localizer 152 and glide path 146 will be effective for a third beam. Similarly, if the switches were set to their second position first beam will be defined by localizer 151 and glide path 145, the second beam by localizer 152 and glide path 146, and the third beam by localizer 153 and glide path 147. In corresponding manner, other switch positions will render other combinations of glide path and localizer beams effective.

In order to render a given glide path or localizer effective for defining a certain beam, such glide path or localizer must not only receive the appropriate synchronizing signal from master keyer 113 so as to cause it to perform its transmissions during the two appropriate intervals allocated to that beam, but must also receive an additional controlling signal to cause it to employ the appropriate modulation "tones" allocated to that beam. Thus, a localizer which is to operate on the third beam must not only receive a synchronizing pulse from output 122 which defines the time for localizer transmissions from the third beam but must also be controlled to employ modulation "tones" of 914 and 982 kc. which are the tones allocated for localizer transmission on this beam. (See the table of tone frequencies given above.)

The control necessary to cause the selection of the appropriate tone frequencies in the several localizer and glide path equipments may consist of three distinctive signals of any type (e. g. +D. C., —D. C. and 60 cycles A. C.). These three characteristic signals may be directly superposed on the synchronizing pulses being thus controlled through the same switches 137—142 which control these impulses. Accordingly, it may be assumed that tone selector signal source 156 applies to outputs 117 and 120 of master keyer 113, a positive D. C. superposed upon the previously mentioned synchronizing pulses, while outputs 118 and 121 have negative D. C. and outputs 119 and 122 have low frequency alternating current superposed upon their synchronizing pulses. These combined pulses operate at the glide path and localizer systems to select the desired combinations of "tone" frequencies in any convenient known manner.

Up to this point only the landing beam control equipment has been considered in detail. It is believed that no similar detailed description of the glide path or localizer transmitters themselves nor of the receiving and displaying equipments on the airplane is necessary, since the general nature of these transmitters and airplane equipments as well as their operating principles can readily be understood from the following sequential description of a series of typical operations. Such sequential description will trace the progress of a typical signal from control equipment 109 through one of the localizer equipments 110, thence through reception unit 73 (Fig. 8) and, beam reception unit 157 to the display unit 158 (Fig. 8) in the airplane.

Assuming that the switches 137—142 have been set to position 6 so that localizers and glide paths 155, 149; 150, 144; and 151, 145; are conditioned respectively for transmitting the "A," "B" and "C" beams, and considering only the operation of localizer 150 (which is shown as a single block in Fig. 10 and shown in greater detail in Fig. 11) it will be seen from Fig. 10 that the output 131 of master keyer 113 will be connected through switch 141 to the localizer 150. Accordingly, the control wire leading to this localizer will be energized with negative D. C. upon which is superposed a set of synchronizing impulses consisting of the 5th impulse out of each group of 10 impulses which are transmitted six times per second by master keyer 113.

Referring now to Fig. 11, the negative D. C. arriving over the control wire 159 from the keyer 113 of Fig. 10 is applied to switcher mechanism 160 so as to actuate this mechanism to its second position thus shifting the wipers of switches 161 and 162 to their second contacts. The localizer 150 is now conditioned for operation at the proper tone frequencies for localizer service on the second beam.

Upon the generation of the next group of synchronizing impulses by the keyer 113, the 5th pulse of the group passes through the switches, as already traced, to the control wire 159 of localizer 150 in Fig. 11, and there serves to trigger the triple pulse generator 163. This triple pulse generator is designed to send out a first pulse of approximately 200 microseconds width, followed by a second pulse whose width is not critical, and then by a third pulse also of 200 microseconds width. The third pulse is similar to the first pulse but occurs 400 microseconds later so that there is a 200 microsecond blank period between the first and third pulses with the second pulse occurring during this blank period. It is the function of the first pulse to time the "fly left" transmissions, while the third pulse times the "fly right" transmissions and, therefore, these pulses should be exactly equal in width, being preferably produced by the same pulser tube. The second pulse which occurs during the interval between the first and third pulses has the function of switching over the antenna mechanism in between the transmissions of the two types of signals and should, therefore, be transmitted somewhat later than the middle of the blank space between the first and third pulses.

The first pulse is applied over line 164 to unblocking circuit 165 so as to render this circuit effective for transmitting a "fly left" modulating tone. Both the "fly left" and "fly right" tones are constantly generated in balanced modulator 166 which is energized by fixed crystal controlled oscillators 167 and 168 at frequencies of 250 kc. and 34 kc. respectively. The output of the balanced modulator 166, therefore, principally consists of two exactly equal sine waves of frequencies 216 kc. and 284 kc. respectively. When circuit 165 is unblocked by the first pulse from generator 163, these two tones are applied through double tuned R. F. transformer 169 to the amplifier 170. The transformer 169 not only selects the 284 kc. component to be used for the "fly up" signal while rejecting the equal 216 kc. component and the other products of modulation, but also because of its narrow selectivity characteristic serves to round the keying produced by circuit 165. Thus, instead of receiving a suddenly starting and suddenly stopping train of sine waves of 284 kc. frequency having a duration of 200 microseconds and a square wave envelope (produced by the keying effect of circuit 165) the amplifier 170 receives a gradual rising and gradual falling train of 284 kc. sine waves whose envelope has a rounded shape.

This rounded train of 284 kc. sine waves is applied to mixer 171 which also continuously receives a heterodyning sine wave from oscillator 172. This oscillator 172 can generate any of three frequencies, but in the case assumed will be generating 578 kc., since the localizer in question is assumed to be used for defining the "B" beam and, therefore, the control signal applied to the switcher mechanism 160 will have set the switch wipers of 161 and 162 to their second contacts as previously explained. The cross modulation of the 284 kc. rounded train and the continuous 578 kc. heterodyning wave will yield the desired "fly up" tone frequency of 862 kc. as well as other undesired cross-modulation products. The output of this mixer 171 is applied through switch 162 in its second position to the double tuned R. F. transformer 173, which screens out the undesired products and transmits only the 862 kc. tone appropriate for "fly left" signals of the "B" landing beam. Such signal is amplified in 174 and used to modulate transmitter 175 which is preferably of a type which emits carrier only in the presence of a modulating signal. Thus, this transmitter emits the desired "fly up" signal consisting of a train of 670 mc. waves modulated with a 862 tone having a rounded envelope somewhat longer than 200 microseconds in duration. Such signal is applied to the usual type of antenna array 176 having a central radiator 177 and a symmetrical set of side radiators 178, the phases of the signals applied to the central and side radiators being such that the radiation takes place predominantly on the right hand side of the desired course.

Shortly afterwards, the second pulse generated by triple pulse generator 163 actuates the transposition switcher 179 over line 180 so as to effectively transpose the transmission line 181 extending to the central antenna of the array. The effect of such transposition is that the next train of waves emitted by the transmitter 163 will be applied to the antenna array 176 with a reversed phase relationship between the central and side antennas so that the radiation will take place predominantly to the left of the desired course as is required for the "fly right" signal.

Finally, the third pulse generated by 163 is applied to unblocking circuit 182 over line 183. This circuit like the circuit 165 applies the 216 kc. and 284 kc. components from modulator 166 to the amplifier 170; but this time these mixed components are passed through transformer 184 instead of transformer 169. The selected component in this case is, therefore, the 216 kc. wave. Therefore, this wave when mixed in 171 with the 578 kc. output of 172 results in a tone frequency of 798 kc. appropriate for the "fly right" signal. Such tone frequency after passing through transformer 173 to screen out undesired cross modulation product is applied through amplifier 174 to the transmitter 175 as before. The corresponding tone modulated carrier wave is again applied to the antenna as previously described but is this time radiated predominantly to the left of the course because of the phase reversal introduced in 179.

The "fly left" and "fly right" signals which are transmitted six times per second as thus described in the form of a "fly left" modulated signal immediately followed by a "fly right" modulated signal are picked up by the antenna of the self-position reception unit 73 on the airplane (see Fig. 8). If the airplane is to the left of the correct course, the "fly right" signals will be received with greater amplitude than the "fly left" signals, the reverse being true if the airplane is to the right of the correct course. If, however, the airplane is exactly on the correct course, the two immediately successive signals of each transmission are picked up with equal amplitudes.

Just prior to the reception of the various "fly left" and "fly right" signals in the three operative localizers and of the corresponding "fly up" and "fly down" signals of the three glide paths, the airplane will receive a 12 microsecond pulse of 670 mc. carrier frequency from the rotary beacon 71 as previously explained in the description of the self-location service. Such signal in addition to being applied to unblocking circuit 97 as previously described, is simultaneously applied to unblocking circuit 185 of beam reception unit 157, thus preparing the unit 157 for the subsequent reception of the various "fly down," "fly left," "fly right" signals.

When the "fly left" signal arrives from localizer 150 which is assumed to be conditioned for defining the "B" beam, as above described, this signal will be received in receiver 91 thus yielding a rounded train of 862 kc. waves. Such train of waves will be applied not only to the width selectors 92, 93, 94 (which will not respond to this signal) but also through unblocking circuit 185 to the mixer 186 of unit 157. Assuming that switches 187, 188, 189 have been set to their second position as shown, so as to condition this beam reception unit 157 for receiving the signals of the B beam, the oscillator 190 will be generating a frequency of 822 kc. which will be constantly applied to the mixer 186. The 862 kc. tone from the "fly left" signal when mixed with this 822 kc. heterodyning wave will yield in the output of mixer 186 a 40 kc. beat note which will pass through the filter 191 to varistor 192. This varistor 192 will rectify the signal to produce a positive current which will pass through switch 188 in its second position to the meter movement 193 of display unit 158.

When the immediately succeeding "fly right" signal arrives at the airplane, it is similarly received in receiver 91 to yield a 794 kc. tone which is applied through unblocked circuit 185 to the mixer 186 as before. Such 794 kc. tone when heterodyned with the 822 kc. output from 190 will yield a beat note of 28 kc. which will pass through the filter 194 to the varistor 192. The polarity of the connections from 194 to 192 should be such that the current produced by rectification of 192 will be negative. This negative current will again be applied through switch 188 in its second position to the meter movement 193 of display unit 158.

Assuming that the plane is exactly on course so that the "fly right" and "fly left" signals just described are received with equal amplitudes, the positive and negative currents which will be applied to the meter movement 193, as above explained, will be of the same magnitude, and therefore, no deflection will be produced. If, however, the plane is to the left of the course, the "fly right" signal will be predominantly received so that the negative current will exceed the positive current, thus resulting in a deflection of the pointer 195 of 193. If the plane is to the right of the course the pointer will be deflected in similar manner but in the opposite direction.

Immediately before the receipt of the two signals above traced, i. e. the "fly left" and "fly right" signals from the localizer used for the "B" beam, the plane will receive a corresponding pair of "fly up" and "fly down" signals from the glide path used for the "B" beam. In the case assumed, where localizer 150 is used for the "B" beam, the glide path used for this same beam would be glide path 144.

All the detailed description of the transmission and reception of localizer signals made with reference to Fig. 11 may be considered as applicable also to the glide path, since all glide path and localizer equipments may be essentially identical. In fact the only difference between the glide paths and localizers is a difference in the antenna arrays employed and a difference in the frequencies of the transformers, and of the three crystals contained in 172 (see Fig. 11). In the case of all the localizers, the transformers 173, 173A, 173B may be tuned to 710, 830 and 950 kc., while the oscillator 172 may have crystals for operation at 458, 578 and 698 kc. to provide frequencies corresponding to the table previously given. In the case of all glide paths, however, the corresponding transformers 173, 173A, 173B are tuned to transmit frequencies of 685 kc. ± 40 ks., 805 kc. ± 40 kc. and 925 kc. ± 40 kc., while the corresponding crystals in the oscillator 172 are ground for 434, 554 or 674 kc.

Thus, when set for "B" beam operation a glide path equipment will produce modulations of 838 and 770 kc. for its "fly up" and "fly down" indications. Such tone frequencies when mixed with the 822 kc. heterodyning wave used for "B" beam reception produce in the mixer 186 beat frequencies of 16 and 52 kc. respectively which are passed by filters 196 and 197 respectively and are detected into positive and negative currents in varistor 198 and then applied through switch 189 in its second position to the meter movement 199 in display unit 158.

It will be seen, therefore, that the localizer signals will control meter movement 193 of display unit 158 while the glide path signals will correspondingly control meter movement 199 of this unit. Meter movement 199 carries a luminous ring 200 which is deflected back and forth (so that its image as seen in inclined mirror 201 seems to move upward or downward) under control of the glide path signals. Meter movement 193 carries a luminous spot 202 normally positioned centrally behind the luminous ring 201 but capable of moving right or left under control of the localizer. The relative positions of the spot and ring are thus controlled by the landing beam signals to produce the several different types of indication shown in diagrams of Fig. 4.

In order to produce horizontal and vertical displacements of the complete group of spots with respect to the viewing frame as illustrated by diagrams 44, 45, 46 and 47 of Fig. 4, the inclined mirror 201 is controlled by Selsyn motor 202A (which is actuated from the radio compass unit) and by a gyroscope 203, having its axis of rotation vertical. Accordingly, the mirror will be tilted vertically by the gyro in response to a vertical tilting of the plane and will be tilted left or right by the radio compass when the plane turns right or left. The luminous spot and ring carried by the meter movements 193 and 199 will, therefore, appear to shift with respect to the viewing frame in the desired manner.

The horizon bar 204 is tilted by sideways tilts of the gyro 203 to show the angle of bank. This bar is placed behind the mirror 201 at the position of the virtual image of the spot and the mirror is sufficiently transparent so that this bar can be seen.

The radio compass function required consists of continuously finding and indicating the direction of a particular localizer or range transmitter. The direction of such transmitter relative to the axis of the plane is called the "relative bearing" of the transmitter; and is shown directly by the needle of the radio compass bearing indicator 32 (see Fig. 2). This same information is preferably also displayed in a slightly different form in the landing beam indicator 158 the information being given in this case in the form of a sideways displacement of the whole ring-and-spot pattern of the indicator (see Fig. 4).

For performing this function, no special equipment is required on the ground since the normal localizer or range signals are made use of. The airplane equipment for performing the radio compass function consists of a forward scanning radio compass unit 205 with a suitable antenna array 206 fixed on a forward portion of the airplane, and a bearing indicator unit 206A (see Fig. 8). The self-position reception unit 73 and the beam reception unit 157 which have already been described as used for other functions are also employed for the radio compass function.

The radio compass unit 205 essentially includes a pattern shifting means 207, 208, an electronic reverser 209, a reversible motor 210 and a modulation detection circuit 214. The energy received on antenna array 206, after passing through phase shifters 209, 208 and electronic reverser 209 is applied over line 211 to the input of receiver 91. Since the direction finding compass unit is designed to receive energy from the localizer beacon, the energy received on antenna 206 will be characterized by the same selective signal as is the localizer signal. This energy is applied over unblocking circuit 185, mixer 186 and filter 213 to a modulation detector 214. Filter 213 is tuned to pass the beat frequency corresponding to the localizer signal. This energy will carry a modulation dependent upon the antenna switching action in antenna array 206. Modulation detector 214 detects only this modulation produced by the reversing switching of electronic reverser 209. When array 206 is aligned with the localizer transmitter, the two outer antennas which are coupled in phase opposition due to transposition 215 will have no effect. The electronic reverser 209 serves alternately to connect the central antenna of the array 206 with one, and the other the two outer antennas, thus producing a modulation effect whenever the outer antennas are not arranged for null reception. This modulation effect, detected in 214, serves to control reversible motor 210 in accordance with the phase of departure of the null reception with respect to the center antenna.

If the antenna is not aligned with the localizer beacon, the incoming signals applied to modulation detector 214 over filter 213 will produce a resultant current which will drive motor 210 in one direction. The shaft of motor 210 is coupled over reduction gearing 216 to phase shifters 207 and 208. These phase shifters are arranged to adjust the phase of the two outer antennas so that the null of the two outer antenna units will be readjusted into alignment with the transmitting beacon. Accordingly, these antennas will again be quickly aligned to null position.

Also coupled to the shaft of motor 210 is a Selsyn generator 217. Selsyn generator 217 is connected by line 218 with Selsyn motor 202A to control the position of mirror 201. Selsyn generator 217 is also further connected to a second Selsyn motor 219 which controls pointer 220 on bearing indicator 32 (Fig. 2). The specific constructions of phase shifters 207, 208, electronic reverser 209 and modulation detector 214 have not been shown in detail since these mechanisms all are well known in the art.

The use of the receiver unit 91 simultaneously to respond to the radio compass unit as well as to the other services will not materially affect any of the other indications. The modulation which results from the rapid phase reversal in the signals from the radio compass unit will always be relatively slight since any appreciable amount of such modulation will cause the motor 210 to readjust the pattern so that it has its null aligned with the signal source, thus reducing any modulation substantially to zero. Accordingly, any such modulation will not adversely affect the operation of the other equipments provided in receiver circuit 73. The non-directive antenna, associated with receiver circuit 73, may be mounted for reception from the rear of the plane, thus supplementing the forward reception of the array 206. In such case, the reception of signals from the various other services may be better than would be possible without this directive array.

The pulse width selectors, shown in the various parts of the circuit, may be of any desirable type. These width selectors serve to select pulses of any particular width to the exclusion of other pulses. In Fig. 12 is illustrated a simple form of width selector described in detail in the copending application of E. Labin and D. D. Grieg, Serial No. 487,072, filed May 15, 1943, now Patent No. 2,440,278 granted April 27, 1948.

The pulses are applied to a tube 221 and produce in the output thereof negative pulses shown at 222. These negative pulses are applied to shock excite tuned circuit 223 which is tuned to a frequency of which the pulse width represents one-half a wave-length. The pulses are simultaneously applied to the grid of damping tube 224 connected across tuned circuit 223. The pulses applied to tank circuit 223 will produce a wave having a negative portion, as shown at 225, and a positive portion at 226. The oscillations produced in tank circuit 223 will tend to go negative after portion 226 has been produced. However, damping tube 224 will short circuit any further negative portion since, at this time, the negative pulse 222 no longer is present on the grid of tube 224. As a consequence, only the portion 225 and 226 are produced.

If pulses of different widths, either smaller or larger, are applied to the input circuit, these pulses will produce portions 226 having lower peak amplitudes since they are not related to the one-half wavelength period as are those of the wanted pulses. Accordingly, the wanted pulses will produce the higher peak values. These higher peak portions 226 from the output of circuit 223 are then threshold clipped by clipper amplifier tube 227. This tube is biased to such a value that the portions 226 of lower amplitude will not pass. The peak portions passed correspond only to the received pulses of the desired width.

While we have disclosed a particular embodiment of our invention, it should be distinctly understood that this is given by way of example and should not be considered as a limitation on our invention. While we have shown a particular set of tone frequencies and selecting arrangements for distinguishing the various localizer, glide path and range beacons, one from another, it will be clear that other types of signals and selecting systems may be used. Furthermore, instead of width selection as the principal selecting function, amplitude, tone or frequency modulation characteristics may be applied to the various pulses to achieve a similar result. The particular embodiment of our invention described herein shows a complete workable system but should be considered only as an illustrated example and not as any limitation on our invention, as defined in the objects thereof and in the accompanying claims.

What is claimed is:

1. In combination, a plurality of localizer beacons, a plurality of glide path beacons operatively associated with said localizer beacons, a plurality of radio range beacons, means for successively and cyclically energizing said radio range beacons and selected ones of said localizer beacons and said glide path beacons with the same carrier frequency energy and selective switching means for selectively connecting desired combinations of said localizer and glide path beacons for energization.

2. A combination according to claim 1, wherein said localizer and glide path beacons of the equisignal type, further comprising a source of a plurality of tone frequencies to provide different pairs of tone frequencies for said selected localizer beacons, and said glide path beacons, and switching means for applying said tone frequencies to said localizer and glide path beacons.

3. A combination according to claim 1, wherein said means for cyclically energizing said beacons comprises means operative to successively energize said beacons over a predetermined small fraction of said cyclic period, whereby the remainder of said period is available for other types of radio services.

4. A combination according to claim 1, further comprising a rotary beacon for producing a rotary beacon line on said same carrier frequency, rotatable means for rotating said rotary beacon at a predetermined speed, and means controlled by said rotatable means for operating said means for the successive cyclic energization of said beacons a multiplicity of times during each rotation of said rotary beacon line.

5. A combination according to claim 1, further comprising a rotary beacon for producing a rotary beacon line on said same carrier frequency, rotatable means for rotating said rotary beacon at a predetermined speed, and means controlled by said rotatable means for operating said means for the successive cyclic energization of said beacons a multiplicity of time during each rotation of said rotary beacon line, an omni-directional radiator for operation on said same frequency, and means controlled by said rotatable means for momentarily energizing said omni-directional radiator every alternate time said rotatable line faces a predetermined reference direction.

6. An aircraft guiding system for providing on an aircraft indications of the course position of a craft relative to an airport, and the azimuth position of said craft relative to said airport, comprising means at said airport for transmitting on a common carrier frequency localizer beacon signals, glide path beacon signals and rotary directive signals, and means for giving to each of said signals distinctive signal characteristics, and means for successively and cyclically transmitting said signals and means on said craft for producing indications from said signals, comprising a single receiver means for receiving and detecting said transmitted signals, selector means responsive to said distinctive signal characteristics for separating said different received signals, and indicator means for producing localizer beacon indications, glide path beacon indications and azimuth directional signals in response to said separated glide path, localizer and rotary directive signals, respectively.

7. A system according to claim 6, further comprising a directive receiving antenna on said aircraft for directively receiving said beacon signal indications, and means on said craft responsive to said directively received beacon signals for providing an indication of the directional heading of said craft relative to the course defined by said localizer beacon signals.

8. A system according to claim 6, further comprising means on said craft for transmitting on a second carrier frequency a series of pulse signals, repeater means at said airport for receiving said pulse signals and retransmitting them at said common carrier frequency, means for giving to said retransmitted pulses a still different signal characteristic, means in the output of said single receiver for selecting said retransmitted pulses, and means responsive to said selected retransmitted pulses for indicating the distance of said craft from said airport.

9. An aircraft guiding system comprising at an airport a radio localizer beacon, a radio glide path beacon, a rotary signal transmitting beacon and a signal repeater system, means for energizing said radio beacons and said repeater successively to transmit signals on a given carrier frequency, and means for giving to the energy transmitted from said beacon systems distinctive signal characteristics, and on a craft to be guided receiver means for simultaneously receiving signals from said beacons and said repeater, means coupled to the output of said receiver means for separating said signals, combined indicator means for producing beacon guiding indications in response to signals from said localizer and said glide path beacons for indicating the position of said craft with respect to a guiding line, a second indicator means responsive to signals from said rotary beacon and said repeater for indicating the distance of said craft from said airport and the azimuth position of said craft with respect to said airport and transmitter means on said craft for transmitting distance indication pulses from said craft to said repeater.

10. An aircraft guiding system according to claim 9, further comprising directive radio receiver means on said craft for receiving energy from one of said beacons, means responsive to said signals received on said directive radio receiver means for adjusting said directive radio receiver into alignment with said radio beacon, and means responsive to adjustment of said directive radio receiving means into said alignment for producing on said first named combined indicator means an indication of the directional heading of said craft with respect to said airport.

11. An aircraft guiding system in accordance with claim 9, wherein said last named indicator means comprising a cathode ray tube indicator, means responsive to signals received from said rotary beacon for controlling the angular position of the beam of said cathode ray tube in accordance with the direction of said craft from said airport, a sweep circuit means controlled in accordance with said transmitted distance indicating pulses to scan said beam radially with respect to the screen of said cathode ray tube, means responsive to alignment of said rotary beacon transmitter with said receiver for altering the brilliance of said cathode ray beam to produce a spot on the screen corresponding in angular position to the direction of the craft in radio position to the distance of the craft from said airport, means for supporting a map of the area adjacent said airport in a position substantially at right angles to the surface of said cathode ray screen, and a viewing screen arranged at an angle bi-secting the angle between said cathode ray screen and said map for providing a superposed picture of said map and said spot whereby said spot will indicate the position of said craft relative to said airport.

12. An aircraft guiding system in accordance with claim 9, wherein said last named indicator means comprises a cathode ray tube indicator means responsive to signals received from said rotary beacon for controlling the angular position of the beacon of said cathode ray tube in accordance with the direction of said craft from said airport, a sweep means controlled in accordance with said transmitted distance finding pulses to scan said beam radially with respect to the screen of said cathode ray tube and means responsive to alignment of said rotary beacon transmitter with said receiver for altering the brilliance of said cathode ray beam to produce a spot on the screen corresponding in angular position to the direction of the craft in radio position to the distance of the craft from said airport, means for supporting a map of the area adjacent said airport in a position substantially at right angles to the surface of said cathode ray screen, a viewing screen arranged at an angle bisecting the angle between said cathode ray screen and said map for providing a superposed picture of said map and said spot whereby said spot will indicate the position of said craft relative to said airport, means for supporting a second map of the area including said airport having a different scale from said map first named, said maps both being transparent and being traced with different colored transparent inks, a pair of lamps mounted beneath said maps producing colored lights corresponding to the colored inks of said maps and switching means operative selectively to light said lamps whereby the map drawn with the other corresponding color ink will become visible and simultaneously alter the magnitude of the sweep voltage applied to said cathode ray tube to provide a sweep corresponding to the scale of the map being viewed.

13. A rotary radio beacon comprising a first means for producing a radiation pattern having a relatively sharp double null, a second means for producing a radiation pattern having a single null aligned with one of the nulls of said first pattern, whereby a beacon line is defined by said second radiation pattern and the other null of said first radiation pattern, means for giving to said radiation patterns different distinctive signal characteristics, goniometer means for producing a rotation of said patterns, and means for transmitting an omnidirectional radio pulse timed with the rotary passage of said beacon line through a predetermined reference direction.

14. A receiver responsive to rotary beacon signals of the type comprising a first radiation pattern having a relatively sharp double null and a second radiation pattern having a single null aligned with one of the nulls of said first pattern, whereby a beacon line is defined by said second radiation pattern and the other null of said first rdiation pattern, said radiation patterns having distinctive signal characteristics, comprising means for receiving the energy transmitted in said first and second patterns, means for segregating said signals in accordance with said distinctive characteristics, an indicator control means for passing the distinctive signals corresponding to said second radiation pattern to said indicator means to produce an indication, and means responsive to signals corresponding to said first pattern for maintaining said indicator control means blocked during reception of energy of said first radiation pattern, whereby said indication is produced only during reception of said second signal alone.

15. A receiver responsive to rotary beacon signals of the type comprising a first radiation pattern having a relatively sharp double null and a second radiation pattern having a single null aligned with one of the nulls of said first pattern, whereby a beacon line is defined by said second radiation pattern and the other null of said first radiation pattern, said radiation patterns having distinctive signal characteristics, comprising means for receiving the energy transmitted in said first and second patterns, means for segregating said signals in accordance with said distinctive characteristics, an indicator having a movable indicating means, means for moving said movable indicator means in a fixed predetermined path in synchronism with rotation of said beacon, indicator control means for passing the distinctive signals corresponding to said second radiation pattern to said indicator means to produce an indication along said line to indicate direction, and means responsive to signals corresponding to said first pattern for maintaining said indicator control means blocked during reception of energy of said first radiation pattern, whereby said indication is produced only during reception of said second signal alone.

16. In a radio guiding system a rotary guiding beacon comprising means for producing a pair of overlapping radiation patterns having distinctive signal characteristics and means for transmitting an omni-directional radio pulse when said rotary beacon is aligned with a particular reference direction, a radio receiver equipment for receiving energy from said rotary beacon comprising an indicator system, means responsive to reception of said omni-directional pulse for starting movement of said indicator system and comprising means responsive to a predetermined relationship of said distinctive signals of said overlapping radiation patterns for producing an indication on said indicator at the instant said ovrlapping patterns are properly aligned with said receiver whereby a directive indication of the alignment of said craft with respect to said beacon is produced.

17. A beacon system according to claim 16, further comprising a distance signal transmitter on said craft for transmitting a series of distance indicating signal pulses, a radio repeater adjacent said rotary beacon for receiving said distance indicating signals and retransmitting pulses in response thereto, means on said craft for producing a distance movement of said indicator in response to said transmitted signals, means on said craft for receiving said retransmitted signals and producing an indication of the distance of said craft from said station in response to said received retransmitted pulses.

18. A beacon system according to claim 16, further comprising means for controlling transmission of said omni-directional pulses to transmit said reference pulses only every alternate time said rotary beacon passes through said reference direction.

19. An indicator for providing on an aircraft an indication of the position of a craft relative to a particular area, comprising a first screen, control means for producing on said first screen an indication of the location of said craft in azimuth and distance, a second transparent screen arranged adjacent to said first screen and at right angles thereto, means for mounting two transparent maps of said particular area and of different scales on said second screen, a third screen positioned to bisect said angle to said two screens, said third screen serving to produce an effective combination of the surfaces of said first and second screens, means mounted below said second screen for providing selective illumination of said maps to render them selectively visible, and means for controlling said illuminating means and said control means for providing a scalar positioning of said indication on said first screen corresponding to the scale of the map which is rendered visible.

20. An indicator for providing on an aircraft an indication of the position of said craft relative to a given position in response to received radio guiding and distance signals comprising a cathode ray tube indicator, means responsive received guiding signals for controlling the angular position of the beam of said cathode ray tube in accordance with the direction of said craft from said given position, a sweep circuit means controlled in accordance with said received distance signals to scan said beam radially with respect to the screen of said cathode ray tube and means responsive to said received guiding signals for altering the brilliance of said cathode ray beam to produce a spot on the screen corresponding in angular position to the direction of the craft in radio position to the distance of the craft from said airport, means for supporting a map of the area adjacent said airport in a position substantially at right angles to the surface of said cathode ray screen, and a viewing screen arranged at an angle bisecting the angle between said cathode ray screen and said map for providing a superposed picture of said map and said spot whereby said spot will indicate the position of said craft relative to said airport.

21. An indicator in accordance with claim 20, further comprising means for supporting a second map of the area including said airport having a different scale than said map first named, said maps both being transparent and being traced with different colored transparent inks, a pair of lamps mounted beneath said maps producing colored lights corresponding to the colored inks of said maps and switching means operative simultaneously to selectively line two of said lamps whereby the map drawn with the other corresponding color ink will become visible and simultaneously alter the magnitude of the sweep voltage applied to said cathode ray tube to provide a sweep corresponding to the scale of the map being viewed.

22. An indicator for use on aircraft combining on a single indicator localizer beacon and glide path beacon indications, and aircraft attitude indications comprising a viewing screen, means for providing on said screen spaced indications, showing the position of said craft relative to said localizer and glide path beacons, means for indicating a line across said screen representing the position of the horizon relative to said craft, and means for moving said spaced indications upward and downward in accordance with a turning of said craft upward and downward from a horizontal position, and means for tilting said line indication right or left in accordance with a left or right tilt of said craft, whereby the position of said indications on said screen with respect to said line indicates the attitude of said craft, and means for moving said spaced indications left or right with respect to said screen upon departure of said craft from a predetermined directional heading.

23. An indicator according to claim 22, wherein said spaced indications comprise a ring shaped indication and a small dot indication, further comprising means for movng said dot indication left and right with respect to said ring shaped indication upon a corresponding departure of said craft from the path defined by said localizer beacon, and means for moving said dot up or down in response to a departure of said craft from the path defined by said localizer below or above said paths, respectively.

24. An aircraft indicator system for guiding an aircraft along a course defined by a localizer beacon and a glide path beacon, comprising a first indicator pointer comprising a normally centrally positioned indication, a second indicator pointer providing ndicator spaced normally on opposite sides of said first indicator pointer, means for moving said first indicator pointer left and right with respect to said center pointer upon departure of said craft to the left or right of said path, means for moving said first reference pointer up or down in response to departure of said craft down or up from said path, direction finder means for determining the directional heading of said craft with respect to said beacons, and means for moving said first and second indicator pointers to the right or to the left in response to corresponding departures in heading of said craft with respect to said path 25. An aircraft indicator according to claim 24, further comprising a horizontal linear indicator pointer, means for moving said horizontal indicator pointer up or down with respect to said first and second indicator pointers in response to departure of said craft down or up from a horizontal position, and means for effectively tilting said horizontal indicator pointer right or left in response to a tilting of said craft left or right.

26. An aircraft indicator according to claim 24, further comprising a mirror screen in said indicator, and a viewing window for observing said mirror screen, and means for producing said indicator pointers as images in said mirror screen.

27. In a craft-guiding system, a receiver responsive to different radio beacon signals time displaced from each other and each signal having distinctive characteristics, means for separating said signals in accordance with their timing, first indicator means for producing guiding indications in response to signals of certain two different characteristics for indicating the position of the craft with respect to a guiding line, and a second indicator means responsive to signals of certain other two different characteristics for indicating the distance and azimuth position of the craft with respect to the point of origin of the last-mentioned signals.

28. The system according to claim 27, and transmitter means for transmitting distance indication pulses from said craft.

29. The system according to claim 27, a directive receiver responsive to one of said beacon signals, means operable by the last-mentioned signals for adjusting the directive receiver into alignment with their point of origin, and means operative thereupon for operating the first indicator means to indicate the heading of the craft.

30. In combination a plurality of stationary beacons, each adapted to emit pulses of electrical energy having particular characteristics, means for cyclically energizing said beacons in a predetermined order with the same carrier frequency energy, and means in each beacon for modulating by its pulses the carrier frequency energy, a rotary beacon also adapted to emit characteristic pulses to modulate the carrier frequency energy, and common means for controlling the rotation of the rotary beacon and the means for cyclically energizing said beacons.

31. In a craft-guiding system, a receiver responsive to different radio beacon signals having distinctive characteristics and to distance indicating pulses, means for separating said signals, first indicator means for producing guiding indications responsive to signals of certain two different characteristics for indicating the position of the craft with respect to a guiding line, and a second indicator means comprising a cathode ray tube responsive to signals of certain other two different characteristics for indicating the distance and azimuth position of the craft with respect to the point of origin of the last-mentioned signals comprising means responsive to one of the controlling signals for determining the angular position of the tube beam in accordance with the direction of the craft with respect to the point of origin of the signal, sweep circuit means controlled by the distance indicating pulses to scan the beam radially with respect to the screen of the tube, means responsive to the alignment of the craft with the point of origin of said one of the controlling signals for altering the brilliance of the beam to produce a spot on the screen indicating the position of the craft, means for supporting a map of the area substantially at right angles to the tube screen, and a viewing screen at an angle bisecting the last-mentioned angle for providing a superposed picture of said map and spot.

32. In a craft guiding system, a receiver responsive to different radio beacon signals having distinctive characteristics, means for separating said signals, said receiver responsive also to distance-indicating pulses, first indicator means for producing guiding indications in response to signals of certain two different characteristics for indicating the position of the craft with respect to a guiding line, a second indicator means comprising a cathode ray tube responsive to signals of other two different characteristics for indicating the distance in azimuth position of the craft with respect to the point of origin of the last mentioned signal comprising means responsive to one of the controlling signals for determining the angular position of the tube beam in accordance with the direction of the craft with respect to the point of origin of the signal, sweep circuit means controlled by the distance-indicating pulses to scan the beam radially with respect to the screen of the tube, means responsive to the alignment of the craft with the point of origin of said one of the controlling signals for altering the brilliance of the beam to produce a spot on the screen indicating the position of the craft, means for supporting a map of the area substantially at right angles to the tube screen, a viewing screen at an angle bisecting the last-mentioned angle for providing a superposed picture of said map and spot, means for supporting a second map of the area having a scale different from the first-mentioned map, both maps being transparent and traced with different colored inks, a pair of lamps mounted beneath said maps producing colored lights corresponding to said colored inks, and switching means for selectively lighting said lamps and at the same time altering the sweep circuit to provide a sweep corresponding to the scale of the map which is visible.

EDMOND M. DELORAINE.
HENRI G. BUSIGNIES.
PAUL R. ADAMS.

REFERENCES CITED

The following references are of record in the file of this patent:

UNITED STATES PATENTS

| Number | Name | Date |
|---|---|---|
| Re. 22,704 | Moseley | Dec. 25, 1945 |
| 1,820,571 | Kruesi | Aug. 25, 1931 |
| 2,082,347 | Leib et al. | June 1, 1937 |
| 2,134,716 | Gunn | Nov. 1, 1938 |
| 2,165,256 | Hansell | July 11, 1939 |
| 2,184,843 | Kramar | Dec. 26, 1939 |
| 2,204,628 | Sorensen | June 18, 1940 |
| 2,208,376 | Luck | July 16, 1940 |
| 2,216,707 | George | Oct. 1, 1940 |
| 2,226,860 | Greig | Dec. 31, 1940 |
| 2,262,245 | Moseley et al. | Nov. 11, 1941 |
| 2,400,232 | Hall | May 14, 1946 |

FOREIGN PATENTS

| Number | Country | Date |
|---|---|---|
| 361,996 | Great Britain | Dec. 3, 1931 |
| 538,214 | Great Britain | July 24, 1941 |